United States Patent
Yan et al.

(10) Patent No.: US 8,988,601 B2
(45) Date of Patent: Mar. 24, 2015

(54) IMAGING SYSTEM WARP CORRECTION WITH PHANTOM ASSEMBLY

(71) Applicant: Siemens Medical Solutions USA, Inc., Malvern, PA (US)

(72) Inventors: Shikui Yan, Knoxville, TN (US); Sam Griffin, New Taxewell, TN (US); Shaun Gleason, Knoxville, TN (US); Ziad Burbar, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 295 days.

(21) Appl. No.: 13/651,590

(22) Filed: Oct. 15, 2012

(65) Prior Publication Data

US 2013/0100345 A1 Apr. 25, 2013

Related U.S. Application Data

(60) Provisional application No. 61/550,517, filed on Oct. 24, 2011.

(51) Int. Cl.
*H04N 5/225* (2006.01)
*H04N 5/217* (2011.01)
*H04N 17/00* (2006.01)
*H01L 31/0203* (2014.01)

(52) U.S. Cl.
CPC .............. *H04N 5/217* (2013.01); *H04N 5/2254* (2013.01); *H04N 17/002* (2013.01)
USPC ........................... 348/374; 250/239; 257/433

(58) Field of Classification Search
USPC .................... 348/374; 250/239; 257/432–434
See application file for complete search history.

(56) References Cited

U.S. PATENT DOCUMENTS

| | | | | |
|---|---|---|---|---|
| 6,060,713 A | * | 5/2000 | Skillicorn et al. | 250/367 |
| 7,782,560 B2 | * | 8/2010 | Huang et al. | 359/824 |
| 7,825,985 B2 | * | 11/2010 | Westerweck et al. | 348/374 |
| 2003/0070288 A1 | * | 4/2003 | Ting | 29/832 |
| 2009/0122426 A1 | * | 5/2009 | Cheng | 359/819 |
| 2011/0030368 A1 | * | 2/2011 | Kume | 60/527 |

OTHER PUBLICATIONS

Product literature, "Installation and Startup—InSpace 3D; For Artis zee/zeego with SW VC14G or higher," Siemens Healthcare Products, 268 pages (2011).

* cited by examiner

*Primary Examiner* — Ngoc-Yen Vu
(74) *Attorney, Agent, or Firm* — Peter Kendall

(57) ABSTRACT

A device for imaging system warp correction includes an object including an imaging phantom, the object being configured for placement of the imaging phantom adjacent a scanning interface of a detector, and a mounting cap coupled to the object and configured to be secured to the detector to establish the placement of the imaging phantom adjacent the scanning interface of the detector. The mounting cap includes a plurality of alignment features configured to align the object and the mounting cap.

21 Claims, 4 Drawing Sheets

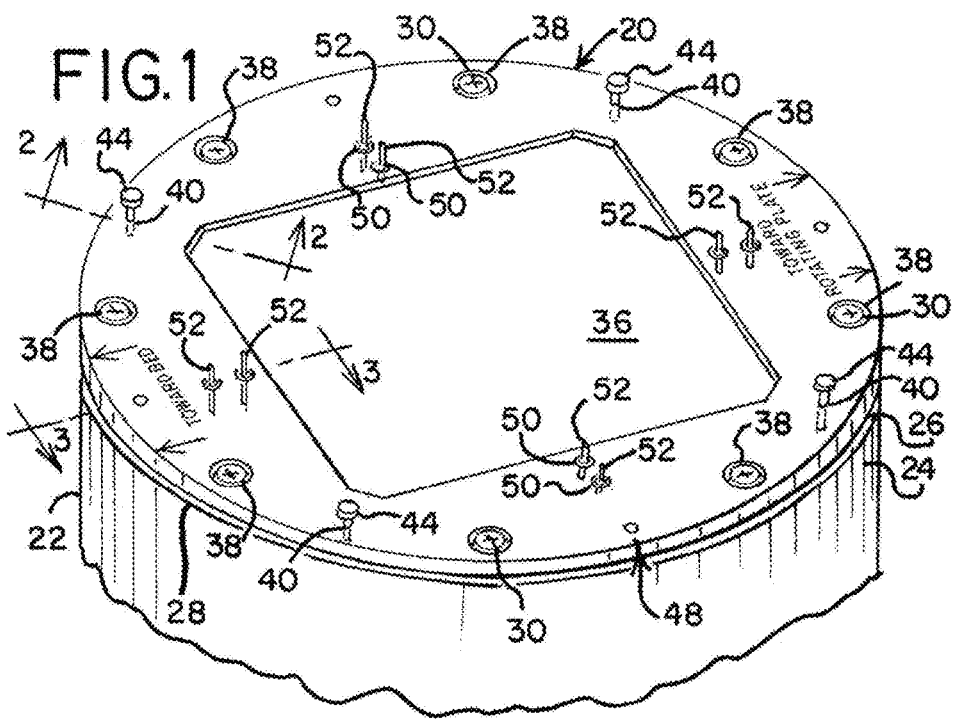
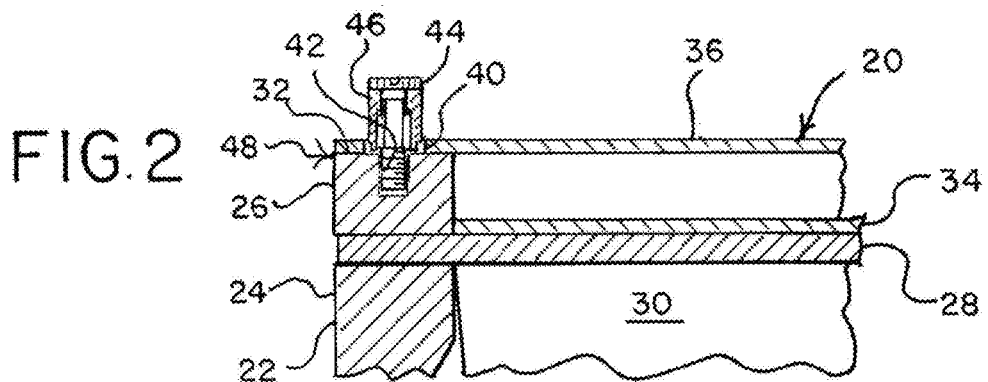
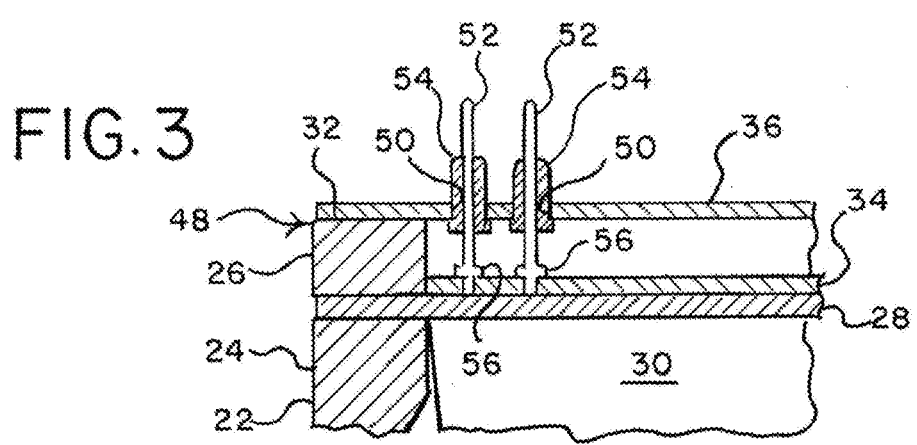

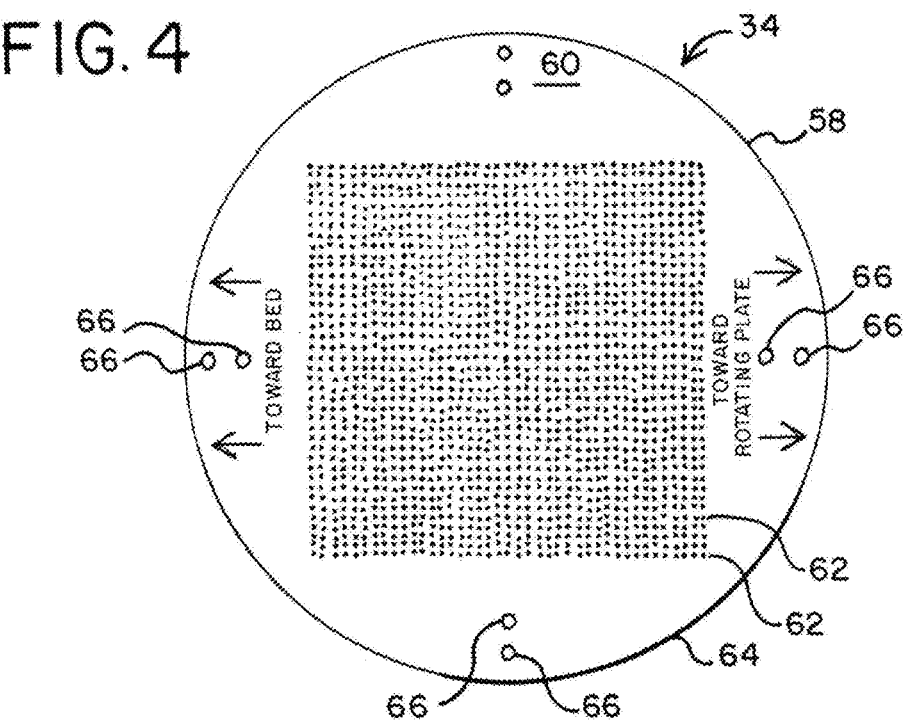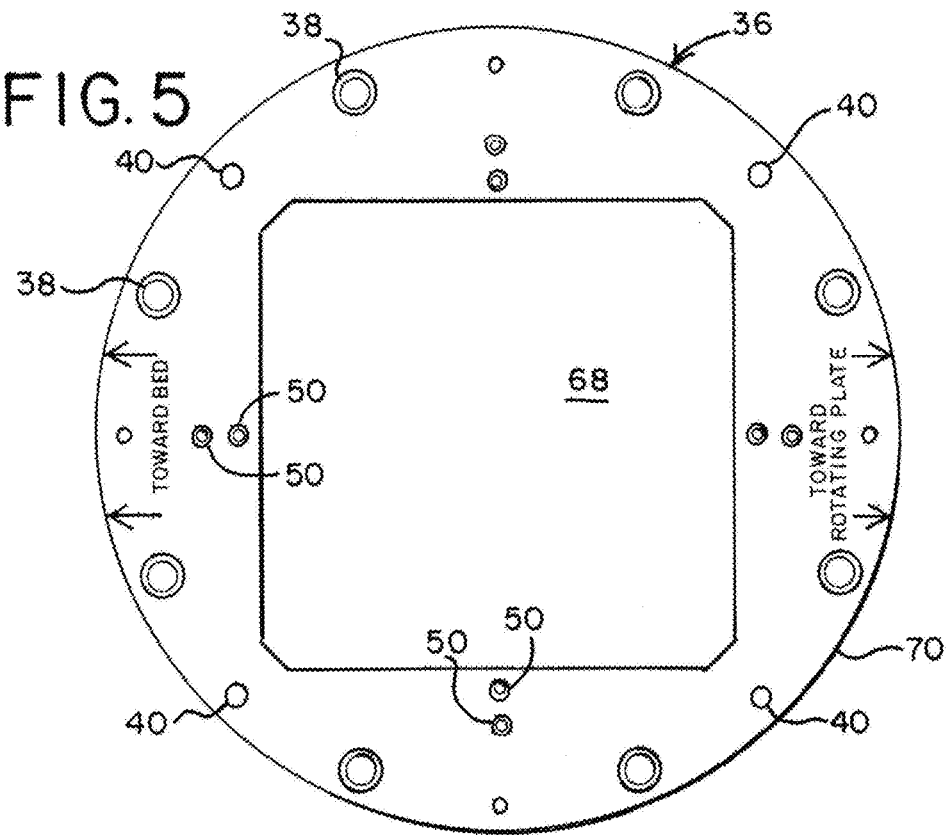

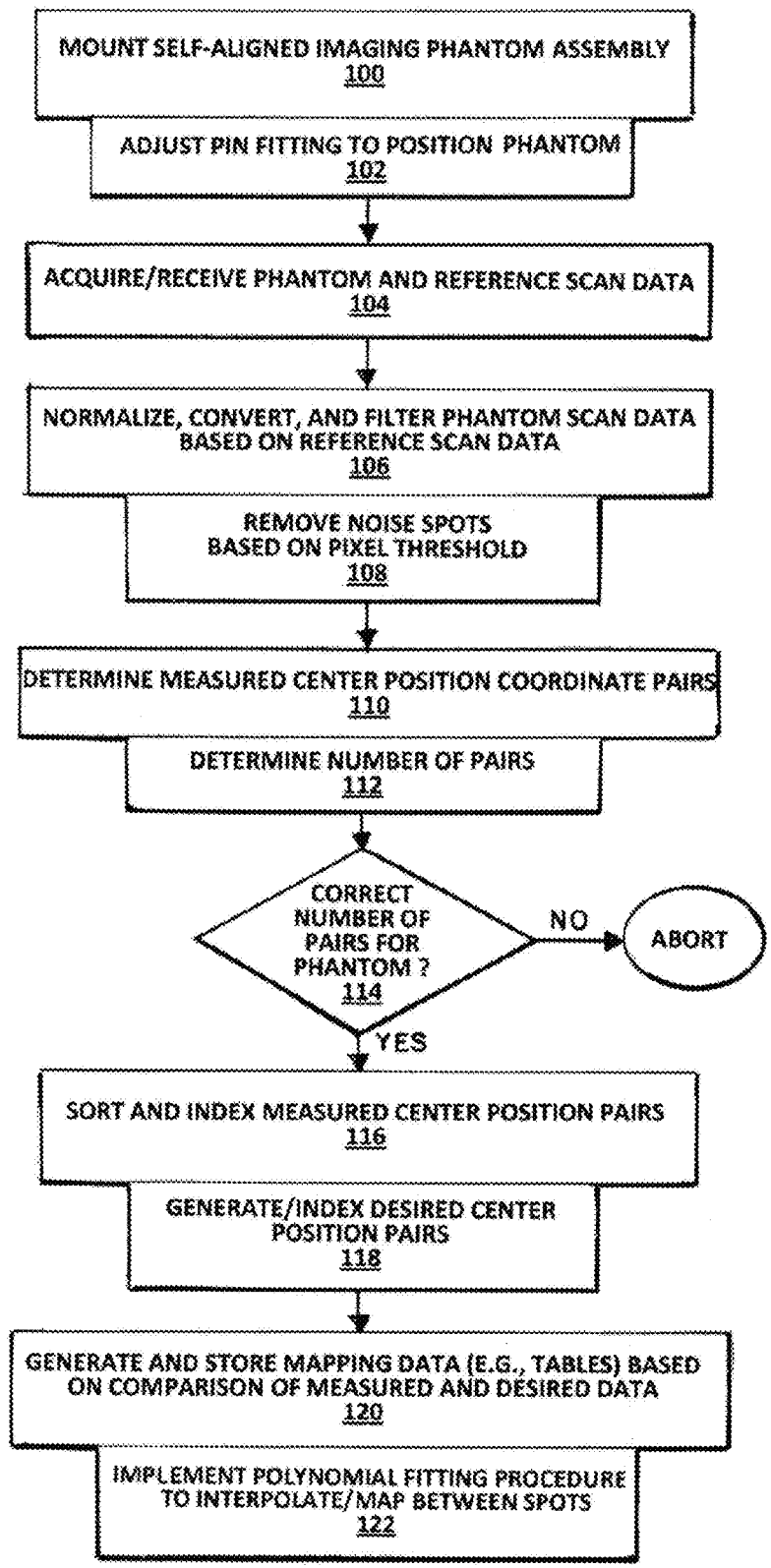

IMAGING SYSTEM WARP CORRECTION WITH PHANTOM ASSEMBLY

CROSS-REFERENCE TO RELATED APPLICATION

This application claims the benefit of U.S. provisional application entitled "Two-Layer Grid Phantom Design for Automated Warp Correction on CT Detectors," filed Oct. 24, 2011, and assigned Ser. No. 61/550,517, the entire disclosure of which is hereby incorporated by reference.

BACKGROUND

The present embodiments relate to imaging systems.

Imaging fiber optic arrangements are useful in pre-clinical applications, such as those involving mouse or rat imaging. The arrangements are often configured to couple light from x-ray or neutron scintillator screens, image intensifiers, or streak tubes. A typical arrangement is configured as a fiber optic taper that reduces the field-of-view (FOV) of the imaging system to, for instance, a range of 100 mm to 150 mm. The fiber optic taper is often bonded to front-illuminated devices, as well as some back-thinned devices.

Geometry distortion in the resulting image is not avoidable in the bonding or production of fiber optical tapers. Warp correction is used to remove the distortion. Image data is acquired for an imaging phantom to generate data for the warp correction. A grid pattern on a printed circuit board is often used as the imaging phantom. The warp correction is based on the offsets in the image data from the grid pattern.

Positioning the grid pattern on the detector is typically challenging. The grid pattern is manually adjusted until sufficiently centered on the detector. The orientation of the grid in the vertical and horizontal directions is also adjusted. The phantom is rotated until the orientation is sufficiently matched to the orientation of the detector. The manual process is tedious, with the grid pattern placed on the detector, and secured with adhesive tape. After image data is obtained to test the positioning, the tape is removed to reposition the grid pattern, and the process is repeated until the position is correct. The manual process is time-consuming, and user errors are easily introduced.

BRIEF SUMMARY

By way of introduction, the preferred embodiments described below include methods, systems, and devices for imaging system warp correction. In one embodiment, an imaging phantom assembly includes a plate or other cap configured to mount on a detector such that an imaging phantom of the assembly is automatically aligned with an orientation of the detector.

In a first aspect, a device for imaging system warp correction includes an object including an imaging phantom, the object being configured for placement of the imaging phantom adjacent a scanning interface of a detector, and a mounting cap coupled to the object and configured to be secured to the detector to establish the placement of the imaging phantom adjacent the scanning interface of the detector. The mounting cap includes a plurality of alignment features configured to align the object and the mounting cap.

In a second aspect, a method of imaging system warp correction includes mounting a self-aligned imaging phantom assembly on a detector, the self-aligned imaging phantom including an arrangement of markings, acquiring scan data representative of the arrangement of markings of the self-aligned imaging phantom assembly, determining a scanned position for each marking in the arrangement of markings based on the scan data, and generating, with a processor, mapping data representative of corrections from the scanned positions to reach a set of desired positions.

In a third aspect, a system for imaging system warp correction includes a self-aligned imaging phantom assembly including first and second boards, the first board including an imaging phantom, the imaging phantom including markings, a detector configured to generate scan data representative of the imaging phantom, the detector including a scanning interface along which the first board is disposed and further including a cover ring to which the second board is mounted, a memory in which the scan data is stored, and a processor configured to determine a scanned position for each marking based on the scan data and to generate mapping data representative of corrections from the scanned positions to reach a set of desired positions.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a perspective view of one embodiment of an imaging phantom device assembly mounted on a detector of an imaging system for warp correction of the imaging system.

FIG. 2 is a partial, cross-sectional view of the imaging phantom device assembly of FIG. 1 taken along lines 2-2 of FIG. 1.

FIG. 3 is a partial, cross-sectional view of the imaging phantom device assembly of FIG. 1 taken along lines 3-3 of FIG. 1.

FIG. 4 is a top view of an exemplary imaging phantom board of the imaging phantom device assembly of FIGS. 1-3 in accordance with one embodiment.

FIG. 5 is a top view of an exemplary mounting cap board of the imaging phantom device assembly of FIGS. 1-3 in accordance with one embodiment.

FIG. 6 is a flow chart diagram showing one embodiment of a method of imaging system warp correction using a self-aligned imaging phantom assembly.

DETAILED DESCRIPTION OF THE DRAWINGS AND PRESENTLY PREFERRED EMBODIMENTS

Figure 7:
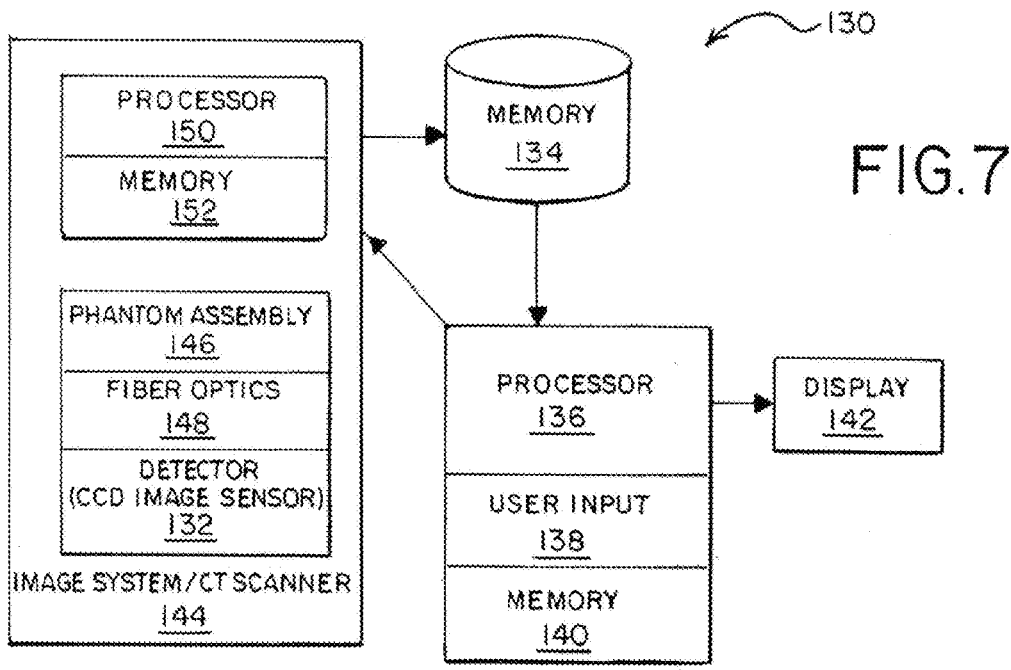
FIG. 7 is a block diagram of one embodiment of a system for imaging system warp correction having a self-aligned imaging phantom assembly.

Systems, methods, and devices are provided for imaging system warp correction. The warp correction may be useful in calibrating an imaging system for geometric distortion arising from fiber optic tapers. The imaging system warp correction is provided by an imaging phantom assembly configured to be aligned and secured to a detector of an imaging system.

The imaging phantom assembly may self-align with an orientation of the detector upon attachment to the detector. The disclosed systems, methods, and devices may avoid the difficulties presented in attempts to manually align an imaging phantom with the orientation of the detector. The imaging phantom assembly provides a reliable and repeatable mechanism for generation of scan data to support the warp correction. A grid pattern or other arrangement of spots, lines, curves, symbols, or other markings of an imaging phantom may be accurately oriented relative to the detector. With the increased reliability of the scan data, an automated procedure for implementing the warp correction may be used and applied to configure or calibrate the imaging system, as described below.

The assembly may be a multiple layer assembly, such as a two-layer assembly. The multiple layers may achieve an accurate and reliable fitting and positioning of an imaging phantom. One layer may facilitate mechanical alignment with the detector. The same layer (or a different layer) may mechanically secure the assembly to the detector. The multiple layers may be configured such that mounting of the assembly on the detector disposes the imaging phantom along or adjacent a scanning interface of the detector. The imaging phantom may thus be in contact with the scanning interface on a detector.

In some embodiments, an upper or top layer of the assembly may include a mounting cap having a number of alignment features directed to alignment with other components of the assembly and/or the detector. A lower or bottom layer of the assembly may include an imaging phantom board having a grid or other pattern on a side facing the detector, and a number of holes for engaging the other components of the assembly. The layers of the assembly may be coupled to one another by a number of positioning or locating pins. The assembly may be secured to the detector by a number of screws or other fasteners. In some embodiments, the fasteners may be captive screws disposed in the mounting cap. The captive screws or other fasteners may be disposed on the mounting cap in positions that correspond with pre-existing threaded holes on a cover ring of the detector. The mounting cap may have a number of further holes to accommodate other features on the cover ring, which may provide further alignment or positioning assistance.

The disclosed phantom assembly devices may be self-aligning with the detector. The disclosed devices are mountable in an error-free and convenient manner. The disclosed devices may be useful for operators and other personnel tasked with positioning and handling the disclosed devices during a calibration or warp correction procedure. Significant efficiencies may be realized in manufacturing, service, or other efforts to calibrate an imaging system. Such efficiencies may be achieved while improving reliability and accuracy through removal of the possibility for operator error in combination with the increase in alignment accuracy.

In addition to facilitating the mounting of an imaging phantom to a detector, the disclosed devices support the automated calibration of an imaging system. The automation may arise from the increased alignment accuracy. For example, the disclosed methods and systems may calibrate the geometric distortion of detectors of computed tomography (CT) imaging systems arising from the incorporation of fiber optic tapers.

Although described in connection with CT scanners, the disclosed methods, systems, and devices are not limited to a particular type of imaging system. The warp correction methods and devices may be applied to non-CT scanners. The disclosed methods, systems, and devices are well suited for imaging systems used in both pre-clinical and clinical applications. Although well suited for correcting for the geometric distortion arising from fiber optic tapers, the disclosed methods, systems, and devices may facilitate calibration or warp correction regardless of the source of the distortion on a detector.

FIGS. 1-3 depict a device 20 for imaging system warp correction. The device 20 is shown in a mounted configuration. The device 20 positions an imaging phantom at a detector interface to support the generation of calibration or scan data for the warp correction. In this example, the device 20 is mounted to a detector 22 of an imaging system. The detector 22 may be a CCD camera or any other type of camera or detector of an imaging system. The imaging system may include a CT scanner or any other type of scanner. For example, the detector 22 may be part of a single photon emission computer tomography (SPECT) system.

The detector 22 includes a frame 24 and a cover ring 26. The frame 24 may provide support and/or protection for internal components of the detector 22. The cover ring 26 secures a camera cover 28 to the frame 24. The camera cover 28 may include a transparent panel or sheet configured to protect the components of the detector 22 housed within the frame 24. In this example, the camera cover 28 is secured to the frame 24 via a number of screws or other fasteners 30 that pass through the cover ring 26 and the camera cover 28 to engage the frame 24.

The frame 24, the cover ring 26, and the camera cover 28 may define a field of view and other aspects of a scanning interface of the detector 22. The cover ring 26 is stacked upon or with the camera cover 28 along a periphery of the scanning interface. The cover ring 26 may thus define an opening of the scanning interface. In this example, the scanning interface is configured such that the camera cover 28 is recessed from a brim or ridge 32 (FIGS. 2 and 3) formed by the cover ring 26. The construction and other characteristics of the scanning interface may vary. For example, the extent to which the camera cover 28 is recessed within the scanning interface may vary.

The frame 24 may support and/or surround a fiber optic taper mechanism shown schematically at 30 (FIGS. 2 and 3). The fiber optic taper mechanism 30 may be disposed adjacent the camera cover 28. The fiber optic taper mechanism 30 may taper inward as the distance from the camera cover 28 increases, as shown. The tapering of the fiber optic taper mechanism 30 introduces geometric distortion. The device 20 addresses such distortion via calibration of the detector 22.

The device 20 is configured to mechanically mount to, and align an imaging phantom with, the detector 22 to generate scan data to be used in the calibration. The device 20 is configured as an assembly of a phantom object 34 (FIGS. 2 and 3) and a mounting cap 36. The phantom object 34 includes the imaging phantom, and is configured to dispose the imaging phantom as close as possible to the scanning interface upon mounting the device 20 to the detector 22. The assembly may be a multiple layer or stacked assembly. The assembly is configured such that the phantom object 34 is disposed at or along the scanning interface. The size, shape, and other characteristics of the phantom object 34 may be configured for placement of the imaging phantom adjacent the scanning interface. For example, the phantom object 34 may be plate-shaped or board-shaped or substantially flat to lie along, or extend across, the scanning interface. The mounting cap 36 is coupled to the phantom object 34 and configured to be secured to the detector 22 to establish the placement of the imaging phantom adjacent the scanning interface of the detector 22.

In the embodiment of FIGS. 1-3, the phantom object 34 and the mounting cap 36 include respective boards or plates disposed in a stacked arrangement. The mounting cap 36 is positioned as a top or upper board, and the phantom object 34 is positioned as a bottom or lower board. The assembly may include additional or alternative boards, plates, or other layers. The upper board provides mechanical alignment and support for the imaging phantom carried or presented by the lower board. The phantom object 34 and the mounting cap 36 need not be plate-shaped or board-shaped. For example, the object 34 and the mounting cap 36 may have non-flat profiles.

The lower board may be a PCB or other board having a customized grid or other pattern or arrangement of markings for the imaging phantom. The pattern may be configured to facilitate the warp correction. For example, the pattern may include a set of dots or spots arranged in a grid. Other patterns may be used to generate scan data well suited for use in generating mapping data to support the warp correction. The lower board may be fabricated such that lead dots or pads or other elements that form the pattern are accurately placed at positions in accordance with the pattern.

The mounting cap 36 includes a number of alignment features to align the mounting cap 36 with the detector 22. The mounting cap 36 and, thus, other aspects of the device 20, such as the imaging phantom, may be aligned with an orientation of the detector 22. In this example, the mounting cap 36 has multiple alignment features for alignment with the detector 22. Fewer or alternative numbers of alignment features may be used. In this embodiment, the mounting cap 36 has a set of holes configured and positioned to support alignment of the mounting cap 36 and the detector 22. Other types of alignment features may be used, such as various types of detents and/or extensions.

In the embodiment shown in FIG. 1, the set of holes includes a first subset of holes 38. The subset of holes 38 may be sized and positioned to accommodate features projecting from the detector 22. For example, the subset of holes 38 may provide clearance for items disposed on, or projecting upward from, the cover ring 26, such as the screw fasteners 30. The heads of the screw fasteners 30 may be captured in the holes 38 upon securing the mounting cap 36 on detector 22. With the screw fasteners 30 captured, the holes 38 may support a coarse alignment between the mounting cap 36 and the detector 22.

As shown in FIGS. 1 and 2, the set of holes includes a second subset of holes 40 on the mounting cap 36. The subset of holes 40 are positioned for alignment with a plurality of threaded holes 42 (FIG. 2) disposed along the cover ring 26 of the detector 22. The threaded holes 42 may be positioned in accordance with the orientation of the detector 22. The device 20 may include a number of screw or other fasteners 44 configured to engage the threaded holes 42. In this example, the screw fasteners 44 are configured as captive screws captured within an enclosure or other frame 46 secured to the mounting cap 36. The captive screws may be spring-loaded. In one embodiment, the screw fasteners 44 are PEM® fasteners available from Penn Engineering. The frame 46 may be soldered or otherwise secured to the board or plate of the mounting cap 36 within or at the holes 40. The threaded engagement of the screw fasteners 44 and the threaded holes 42 may provide fine-tuned alignment of the mounting cap 36 and the detector 22. In other embodiments, the detector 22 may include non-threaded holes or other features to which the alignment features of the mounting cap 36 may be aligned. The mounting cap 36 may include and/or use any number of alignment holes to engage the detector 22 and align with the orientation of the detector 22.

The orientation of the detector 22 need not rely on the positioning of the threaded holes 42 in the cover ring 26. In other embodiments, the detector 22 may include alternative or additional features indicative of the orientation of the detector 22. In such cases, the alignment features of the mounting cap 36 may be configured accordingly to engage or otherwise reference the features indicative of the orientation.

As shown in FIG. 1 and/or FIG. 2, the holes 38, 40 are disposed at or along a periphery 48 of the mounting cap 36. Such positioning along the periphery 48 allows the holes 38, 40 to accommodate features on the cover ring 26 and/or to align with features on the cover ring 26. The positioning of such features may vary in other embodiments. For example, the mounting cap 36 may include a downwardly projecting lip, flange, or other projection positioned to engage an inner sidewall of the cover ring 26 and/or one or more features disposed on the inner sidewall.

As shown in FIGS. 1 and 3, the mounting cap 36 includes another plurality of alignment features configured to align the phantom object 34 and the mounting cap 36. In this example, each of the alignment features includes a respective alignment hole 50 in the board or plate of the mounting cap 36. The alignment holes 50 or other alignment features are inset from the periphery 48 to allow alignment pins 52 to couple the boards of the phantom object 34 and the mounting cap 36. The alignment holes 50 are located on the mounting cap 36 inward of the holes 38, 40. The imaging phantom may thus be sized for positioning within the cover ring 36 of the detector 22 as shown in FIGS. 2 and 3.

As best shown in FIG. 3, each alignment feature also includes a socket 54 disposed in the alignment hole 50. Each alignment pin 52 is captured in one of the holes 50 via a respective one of the sockets 54. Each socket 54 may be soldered or otherwise secured to the board or plate of the mounting cap 36. In this example, each alignment pin 52 has a head 56 implanted or otherwise secured to the phantom object 34. Each alignment pin 52 projects from the phantom object 34 to engage a respective one of the sockets 54. The alignment pins 52 have a length sufficient to allow a spacing between the phantom object 34 and the mounting cap 36 to be adjusted. The holes 50 and the sockets 54 may thus be configured as through-holes to allow for the adjustment.

The spacing may be adjusted by applying a force to compress the assembly via, for instance, the application of pressure on the mounting cap 36. Such adjustment may be useful during installation of the imaging phantom. For example, the spacing may be decreased by pressing downward on the mounting cap 36 while the board of the phantom object 34 is in contact with the camera cover 28. The spacing is adjusted to match a distance between the scanning interface and the cover ring 26. In this example, the spacing is decreased until the spacing corresponds with the thickness of the cover ring 26.

Each socket 54 may be tapered or otherwise configured to establish a pressure-fit, friction-fit, or other tight fit with the alignment pin 52. The tight fit allows the alignment pin 52 to be firmly lodged in the socket 54. The spacing between the phantom object 34 and the mounting cap 36 may thus remain stable. Such stability is provided absent the application of sufficient force for adjustment. The imaging phantom may thus remain in contact with the camera cover 28, e.g., as close as possible to the scanning interface.

FIG. 4 shows the phantom object 34 in accordance with one embodiment. In this example, the phantom object 34 includes a board 58 having a side 60 with an array of dots 62. The dots 62 are arranged in a grid pattern in this embodiment. Other dot arrangements may be used. The dots 62 are disposed in an inner area of the board 58, inside of a periphery 64 of the board 58. The dots 62 may be distributed over the inner area such that a significant portion (e.g., 90%) of the field of view of the detector 22 (FIGS. 1-3) is covered.

The board 58 is arranged in the phantom assembly such that the side 60 having the dots 62 faces the scanning interface. The board 58 is pushed downward or toward the scanning interface to achieve contact with the scanning interface, as described above.

In the example of FIG. 4, the board 58 includes a number of alignment holes 66 along the periphery 64 for the alignment pins 52 (FIGS. 1 and 3). The alignment pins 52 are secured or otherwise fixedly captured in the alignment holes 66. For example, the alignment pins 52 may be soldered in the alignment holes 66.

In this embodiment, the alignment holes 66 (and thus the alignment pins 52) are arranged in multiple pairs, with one pair in each quadrant. Each pair of the alignment holes 66 is radially oriented along the board 58. Such pairing and positioning may eliminate rotation and/or offset between the board 58 and the mounting cap 36 (FIGS. 1-3). In one example, rotation offset is reduced to less than 0.1°.

FIG. 5 shows the mounting cap 36 in accordance with one embodiment. In this example, the mounting cap 36 includes a plate 68 in which the holes 38 and 40 are formed. The alignment holes 50 are also formed in the plate 68. The alignment holes 50 are disposed in the paired, radial arrangement described above to remove rotation and offset between the mounting cap 36 and the phantom object 34 (FIGS. 1-3). The alignment holes 50 are offset from a periphery 70 of the plate 68 for alignment with the holes 66 in the board 60 (FIG. 4), which is smaller to fit inside the cover ring 26 (FIGS. 1-3). In contrast, the holes 38 and 40 are disposed along the periphery 70 for mounting the plate 68 to the cover ring 26.

The material, construction, thickness, and other characteristics of the board 58 (FIG. 4) and the plate 68 may vary. For example, the plate 68 may be a PCB or other board similar to the board 58.

The mounting, alignment, and phantom aspects of the disclosed devices may be integrated into a single component. Rather than having multiple layers, the disclosed devices may be configured to mount and align a phantom with a structure configured in accordance with the detector and/or the scanning interface. For example, in detectors having a cover ring as described above, a single component may be shaped to accommodate the recess from the cover ring to the scanning interface. The single component may thus mount to a top, upper, or other exposed side of the cover ring as well as extend into the recess to reach the detector cover for proximity to the scanning interface.

FIG. 6 depicts an exemplary warp correction method in accordance with one embodiment. The method may utilize the above-described phantom assemblies to facilitate calibration. The results of the calibration may be more accurate and reliable due to the self-aligning nature of the above-described phantom assembles. The automation of the warp correction method may also remove or avoid errors from being introduced during the processing of the scan data representative of the phantom assembly. Additional, fewer, or alternative acts may be included in the method. For example, the method need not include generation of the scan data. The scan data may be stored from a previous calibration sequence. The method may be used with phantom designs other than the grid patterns and phantom assemblies described above.

The method may begin the imaging system warp correction with an act 100 in which a self-aligned imaging phantom assembly is mounted on a detector. The self-aligned imaging phantom includes an arrangement of spots, dots, or other markings as described above. In cases in which the assembly includes an adjustable pin-based fitting as described above, the act 100 may include an adjustment of the alignment pin fitting in an act 102 to position the imaging phantom at or along the scanning interface of the detector. For example, mounting the self-aligned imaging phantom assembly may include pressing downward on a mounting plate of the self-aligned imaging phantom assembly to adjust the pin-based fitting. A phantom grid board may thus be positioned adjacent a scanning interface of the detector.

Scan data is then acquired in an act 104. The scan data is representative of the arrangement of spots of the self-aligned imaging phantom assembly. The act 104 may also include the acquisition of reference scan data. For example, the reference scan data may be representative of a light image without the phantom object at the scanning interface. In such cases, the scan data representative of the phantom object may be normalized or otherwise filtered in an act 106 based on reference scan data. Such preprocessing may remove spurious spots from the scan data. After normalization, the scan data may be converted to another format (e.g., a binary format), and filtered. The filtering may include an act 108 in which noise is removed from the scan data. In the example shown, the filtering process involves removing noise based on a pixel threshold. If the scan data includes data representative of a spot having a size below a number of pixels, then such data is removed, modified, or otherwise disregarded. For instance, the pixel threshold for a spot may be 100 pixels if the size of the actual spot corresponds with about 200 pixels. Any data representative of a spot smaller than 100 pixels is then discarded or disregarded as noise. Other filter processes may be used. For example, the filtering may alternatively or additionally include an intensity-based analysis.

The noise level in the scan data may be a function of the exposure time or dynamic range of the imaging system. For example, it may be useful to increase the exposure time or implement other scanning techniques to make use of the full dynamic range of the imaging system during data acquisition.

After the above-described preprocessing of the scan data, the filtered scan data may be processed in an act 110 to determine a measured or scanned center position for each spot in the arrangement of spots based on the scan data. In one example, the measured center position is determined via a weighted centroid calculation. Other techniques may be used. The measured center position may be indicated by an x,y coordinate pair.

The number of pairs may be determined in an act 112. The number of pairs is indicative of the number of spots detected in the filtered scan data. The method may then determine in an act 114 whether the filtered scan data and the phantom object have a matching number of spots. The number of spots detected in the scan data may not be correct, if, for instance, the filtering or other pre-processing improperly disregarded the data for a spot, or improperly characterized noise as a spot. If the numbers do not match, then the procedure is aborted to obtain new scan data. In some embodiments, a determination of whether each measured position pair can be mapped to a corresponding position pair in the actual or desired data is implemented during the generation of the mapping data described below.

If the correct number of spots have been identified in the filtered scan data, control passes to an act 116 in which the center position coordinate pairs are sorted and indexed. The indexing places the coordinate pair data in an order that corresponds with the arrangement of spots on the phantom object. The act 116 may include indexing data indicative of the actual or desired center positions of the spots on the phantom in an act 118. In other cases, an index of the desired position data is predetermined or otherwise already available.

In one embodiment, the x,y coordinate data is sorted into a two-dimensional position matrix. The data for each center position is associated with a respective row index and a respective column index. The row and column indices may be used to match the center position data with the appropriate desired position data.

With the coordinate pair positions indexed, the filtered scan data may be compared with the actual or desired position data. A processor may be used to implement the comparison and/or generate mapping data in an act 120. The mapping data is indicative or representative of corrections applied to the scanned center positions to reach the set of desired center positions. In this example, the mapping data is arranged in one or more tables. The corrections may involve any combination of translation, rotation, or other displacement of the measured center positions. Alternatively or additionally, the generation of the mapping data may include the implementation in an act 122 of a polynomial fitting procedure to generate the mapping data. The corrections may be represented by a polynomial or other fitting. The fitting may be used to generate the mapping data for all points in the field of view, or to interpolate mapping data for positions in between the spots.

The act 120 may include one or more storage operations that provide the resulting mapping data. For example, the mapping data may be stored in a memory for later use during a calibration procedure. Alternatively or additionally, the mapping data may be stored in a memory of the imaging system to apply the mapping data for calibration and use. The mapping data may also be stored or used in connection with the generation of a user interface that provides feedback to an operator involved in the calibration.

Implementation of the disclosed methods allows the warp correction calibration of an imaging system to be automated. For example, the method may automate the process to an extent that calibration is achieved upon an operator loading or otherwise providing the scan data for two images (e.g., grid and light image). The pre-processing of the scan data, the center calculation and counting of the spots, mapping data generation, and other acts of the method may all be implemented without operator intervention.

Additional steps may be included in the warp correction method of FIG. 6. For example, a user interface may be generated to depict the results of the warp correction. The user interface may be provided via a display as described below. The user interface may include one or more user prompts to allow an operator to, for instance, select scan data for processing. The user interface may also support initiation, storage, or other act of the warp correction method.

FIG. 7 depicts an exemplary system 130 configured to facilitate the implementation and/or application of imaging system warp correction calibration. In this example, the system 130 includes a detector 132, a memory 134, a processor 136, a user input 138, a memory 140, and a display 142. The system 130 may also include an imaging system 144 calibrated via the application of the disclosed warp correction methods. The imaging system 144 includes the detector 132. The system 130 may include additional, fewer, or alternative components. For example, the memories 134 and 138 may be integrated into a single memory.

The system 130 includes a self-aligned imaging phantom assembly 146, which may be configured as a multiple-layer assembly as described above. The assembly may be configured in a stacked arrangement. For example, the assembly may include a number of boards or plates, with a lower or phantom board including an imaging phantom having a grid or other arrangement of spots, and an upper or mounting board for mounting and alignment with the detector 132.

As described above in connection with FIGS. 1-5, the mounting board may include a first plurality of alignment holes positioned to align the boards of the stacked assembly. The mounting board may include a second plurality of alignment holes positioned to align the mounting board with the detector 132. The self-aligned imaging phantom assembly 146 may further include a set of alignment pins secured to the phantom board and projecting therefrom to engage sockets in alignment holes on the mounting board, as described above. The detector may have a cover ring or other structure having a set of threaded holes engaged by threaded fasteners of the assembly to secure the mounting board to the detector 132.

The detector 132 is configured to generate scan data representative of the imaging phantom. The detector 132 includes a scanning interface along which the lower board is disposed to position the imaging phantom along the scanning interface. The detector 132 may also include a cover ring to which the upper board is mounted, as described above.

The scan data generated by the imaging system 144 may be stored in the memory 134. The imaging system 144 may be or include a CT scanner, a SPECT scanner, or any other type of imaging system. The detector 132 may include one or more CCD or other image sensors. A fiber optic taper or other fiber optics 148 may be coupled to, or integrated with, the detector 132. The imaging system 144 may include one or more imaging modalities or scanners. The memory 134 may be co-located with the imaging system 144, co-located with the processor 136, or remotely located from the imaging system 144 and the processor 136.

The processor 136 is configured to determine a scanned center position for each spot in the arrangement of spots based on the scan data. The processor 136 is further configured to generate mapping data representative of corrections from the scanned center positions to reach a set of desired center positions. The mapping data may be useful for calibrating the imaging system 144 to address distortion introduced by the fiber optics 148.

In this example, the imaging system 144 includes a processor 150 and a memory 152, which may be used to implement scanning operations and/or calibrate the imaging system 144. In one example, the mapping data may be stored in the memory 152 for later use by the processor 150 during image processing. The processor 150 and the memory 152 may be integrated with one or more of the other processor(s) or memory(ies) of the system 130 to any desired extent.

In the embodiment of FIG. 7, the scan data is stored in the memory 134, which may be configured as a database or other data repository. The configuration of the memory 134 may vary. For example, the memory 134 may include any number of memories or data stores. The memory 134 may also be used to store reference scan data and/or the mapping data.

The imaging system 144 and the memory 134 may be disposed remotely from one or more other components of the system 130. For example, the imaging system 144 need not be located at the site of the processor 136. The imaging system 144 and the memory 134 may be communicatively coupled or connected with the processor 136 via any communication technology, such as a network.

The processor 136 is in communication with one or more of the above-described components of the system 130 to process the scan data. The user input 138 may be used to select scan data, reference scan data, or one or more parameters to support the generation of the mapping data. For example, the user input 138 may be used for an operator to specify a pixel threshold for the processing. The processor 136 may also be directed to calibrating the imaging system 144 based on the results of the processing. The processor 136 may access the scan data stored in the memory 134 or otherwise receive the scan data captured by the detector 132. The processor 136 may be configured to implement one or more normalization, filtering, or otherwise preprocess operations on the scan data. Once the scan data is pre-processed, the processor 136 may then generate the mapping data for warp correction, a representation of which may be presented via the display 142. The display 142 is may display the scan data before, during, and/or after processing.

The scan and other data may be obtained, received, or transmitted via any communication technology. Alternatively or additionally, the processor 136 may be integrated with the imaging system 144 to implement one or more processing tasks of the imaging system 144 in addition to calibration and/or other configuration tasks.

The processor 136 (and/or the processor 150) is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for determining position and/or generating images. The processor 136 is a single device or multiple devices operating in serial, parallel, or separately. The processor 136 may have any number of processing cores distributed over one or more devices. The processor 136 may be a main processor of a computer, such as a laptop or desktop computer, or may be a processor for handling some tasks in a larger system, such as in an imaging system.

The memory 140 (and/or the memory 134 and/or the memory 152) is a graphics processing memory, video random access memory, random access memory, system memory, cache memory, hard drive, optical media, magnetic media, flash drive, buffer, database, combinations thereof, or other now known or later developed memory device for storing data or video information. The memories 134, 140, and/or 152 may be part of an imaging system, part of a computer associated with the processor 136, part of a database, part of another system, or a standalone device.

The acts described in connection with FIG. 6 may be implemented via instructions executed by the programmed processor 136. Data representative of the instructions may be stored in the memory 140 or any other memory. The acts may be implemented by one or more processors and one or more memories in addition or alternative to the processor 136 and the memory 140. The instructions may include computer code to direct the processor 136 or other processor(s) to perform the acts described above. Additional, fewer, or different operations or acts may be implemented. For example, the convolution operations may include the decomposition of the non-separable kernel.

The memory 140 or other memory may include a non-transitory computer readable storage medium storing data representing instructions executable by the programmed processor 136. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, and parallel processing, as described above.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

Additional, fewer, or different components may be provided. For example, a network or network connection may be provided, such as for networking with a medical imaging network or data archival system. One or more user inputs or other user interfaces may be provided.

Figure 8:
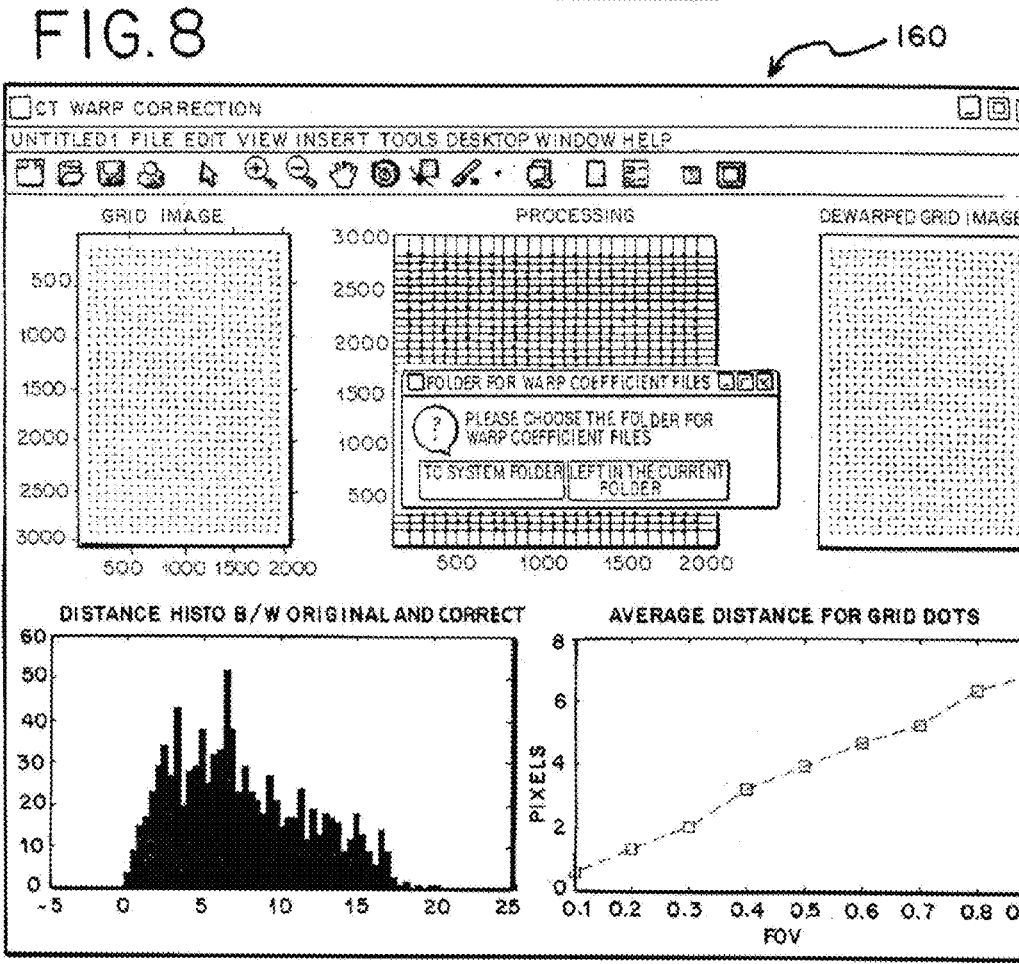
FIG. 8 is a schematic representation of a user interface generated by the system of FIG. 7 during imaging system warp correction in accordance with one embodiment.

FIG. 8 depicts an exemplary graphical user interface 160 generated by the above-described methods and systems. The processor 136 (FIG. 7) may be further configured to generate the user interface 160. Statistical, graphical, and other data representative of distortion of a detector may be displayed via the user interface 160. The user interface 160 may be rendered via the display 142 (FIG. 7) or any other display, such as a display of the imaging system 144 (FIG. 7). The user interface 160 may be generated by any one or more of the processors described above. The user interface may be generated during the implementation of the above-described methods.

In the embodiment of FIG. 8, the user interface 160 presents a representation of the scan data, labeled "Grid Image," to show the original image of the phantom object captured by the imaging system. In this example, the phantom image is shown as a grid of detected dots or spots points. The interface also includes a representation of the processing of the scan data, which may include one or more preprocessing operations, as well as the generation of mapping data. The processing is directed to correction to a desired grid pattern, the points of which are specified in the user interface by sets of intersecting grid lines. The depiction of such processing in a "Processing" panel of the user interface 160 may include the rendering of the dots or spots that pass a threshold or filtering analysis, as described above.

Upon completing the processing, the user interface 160 presents a graphical depiction of the corrected scan data, labeled "Dewarped Grid Image." The corrected scan data may be presented as a set of dots now aligned with the grid pattern intersections.

As shown in the embodiment of FIG. 8, the user interface 160 may include a number of plots or other graphical presentations of statistical data representative of the distortion. In this example, the statistical data is displayed via a distance histogram or other plot that shows the number of spots as a function of distance (e.g., in pixels) between the desired and measured positions. The statistical data is also presented via a plot or graph that depicts the average distance (e.g., in pixels) between the desired and measured positions as a function of field of view. The nature, format, number, and other characteristics of the plots, graphs, and other presentations may vary.

The user interface may include additional, fewer, or alternative interface elements. For example, the user interface may include one or more charts, graphs, or other elements to present statistics or other information regarding the scan and/or other data. In some cases, statistical data is provided via the user interface 160 to present an indication of the extent of the distortion. One graph may be a histogram that plots the number of spots for each distance offset from the actual position. Another graph may plot the average offset distance as a function of distance from the center of the image. The graph may thus provide an indication of the extent to which the distortion is located near the center of the image and/or near the outer borders of the image.

The above-described imaging phantom assemblies may accurately align an imaging phantom with a detector. Two- or other multiple-layer imaging phantom assemblies may be used. One layer of the assemblies may provide a grid pattern or other arrangement to present an imaging phantom. Such arrangements may be useful in implementing warp correction on CT detectors. With the accurate alignment and positioning of the phantom arrangement, scan data representative of a grid image may be processed to automatically generate geometry correction (dewarping) mapping tables as described above.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A device, the device comprising:
   an object comprising an imaging phantom, the object being configured for placement of the imaging phantom adjacent a scanning interface of a detector; and
   a mounting cap coupled to the object and configured to be secured to the detector to establish the placement of the imaging phantom adjacent the scanning interface of the detector;
   wherein the mounting cap comprises a plurality of alignment features configured to align the object and the mounting cap,
   wherein the device provides warp correction for an imaging system.

2. The device of claim 1, wherein:
   the object and the mounting cap comprise first and second boards, respectively, disposed in a stacked arrangement; and
   each alignment feature of the plurality of alignment features comprises a respective hole through the second board.

3. The device of claim 2, wherein each alignment feature of the plurality of alignment features further comprises a socket disposed in the respective hole.

4. The device of claim 3, further comprising a set of alignment pins secured to the object, each alignment pin projecting from the object to engage a respective one of the sockets.

5. The device of claim 4, wherein the alignment pins have a length sufficient to allow spacing between the phantom object and the mounting cap to be adjusted.

6. The device of claim 4, wherein each socket is configured to establish a pressure-fit engagement with the alignment pins and to adjust the spacing between the object and the mounting cap to match a distance between the interface of the detector and a cover ring of the detector to which the mounting cap is secured.

7. The device of claim 1, wherein the plurality of alignment features are arranged in multiple pairs, each pair being radially oriented along the mounting cap.

8. The device of claim 1, wherein the mounting cap comprises a set of holes configured and positioned to support alignment of the mounting cap and the detector.

9. The device of claim 8, wherein:
   a first subset of the holes are sized and positioned to accommodate features projecting from the detector; and
   a second subset of the holes are positioned for alignment with a plurality of threaded holes disposed along a cover ring of the detector.

10. The device of claim 9, further comprising a set of threaded fasteners captively engaged with the mounting cap and positioned in the second subset of holes to engage the plurality of threaded holes on the detector, respectively.

11. The device of claim 9, wherein:
   the first and second subsets of the holes are disposed along a periphery of the mounting cap for the alignment with the cover ring of the detector; and
   the plurality of alignment features are disposed on the mounting cap inward of the first and second subsets of the holes such that the imaging phantom is sized for positioning within the cover ring of the detector.

12. A method of imaging system warp correction, the method comprising:
   mounting a self-aligned imaging phantom assembly on a detector, the self-aligned imaging phantom assembly comprising an arrangement of markings;
   acquiring scan data representative of the arrangement of markings of the self-aligned imaging phantom assembly;
   determining a scanned position for each marking in the arrangement of markings based on the scan data; and
   generating, with a processor, mapping data representative of corrections from the scanned positions to reach a set of desired positions.

13. The method of claim 12, wherein mounting the self-aligned imaging phantom assembly comprises pressing downward on a mounting plate of the self-aligned imaging phantom assembly to adjust an alignment pin-based fitting and position a board adjacent a scanning interface of the detector, the board comprising the arrangement of markings.

14. The method of claim 12, further comprising filtering the scan data based on reference scan data to remove spurious markings from the scan data.

15. The method of claim 14, further comprising determining whether the filtered scan data and the arrangement of markings have a matching number of markings.

16. The method of claim 12, further comprising indexing the scanned positions in an order that corresponds with the arrangement of markings.

17. A system for imaging system warp correction, the system comprising:
   a self-aligned imaging phantom assembly comprising first and second boards, the first board comprising an imaging phantom, the imaging phantom comprising markings;
   a detector configured to generate scan data representative of the imaging phantom, the detector comprising a scanning interface along which the first board is disposed and further comprising a cover ring to which the second board is mounted;
   a memory in which the scan data is stored; and
   a processor configured to determine a scanned position for each marking based on the scan data and to generate mapping data representative of corrections from the scanned positions to reach a set of desired positions.

18. The system of claim 17, wherein:
   the second board comprises a first plurality of alignment holes positioned to align the first and second boards; and the second board comprises a second plurality of alignment holes positioned to align the second board with the detector.

19. The system of claim 18, wherein:
the self-aligned imaging phantom assembly further comprises a set of alignment pins secured to the first board;
each alignment hole of the first plurality of alignment holes comprises a socket disposed in the alignment hole; and
each alignment pin projects from the first board to engage a respective one of the sockets.

20. The system of claim 17, wherein:
the cover ring of the detector comprises a set of threaded holes; and
the mounting cap comprises a plurality of threaded fasteners aligned with the set of threaded holes to secure the mounting cap to the detector.

21. The system of claim 17, wherein the processor is further configured to generate a user interface via which statistical data representative of distortion of the detector is displayed.

* * * * *